United States Patent
Rademacher et al.

(10) Patent No.: US 9,062,618 B2
(45) Date of Patent: Jun. 23, 2015

(54) SYSTEM AND METHOD FOR CONTROLLING AN AUTOMATIC STOP-START ENGINE SYSTEM IN AN AUTOMOTIVE VEHICLE HAVING AN ELECTRIC PARKING BRAKE

(71) Applicant: FORD GLOBAL TECHNOLOGIES, LLC, Dearborn, MI (US)

(72) Inventors: Eric Michael Rademacher, Royal Oak, MI (US); Kirk Pebley, Novi, MI (US); Karl-Peter Hesseler, Cologne (DE); David Anthony Symanow, Plymouth, MI (US); Donna L. Bell, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 13/766,943

(22) Filed: Feb. 14, 2013

(65) Prior Publication Data

US 2014/0229090 A1 Aug. 14, 2014

(51) Int. Cl.
*F02D 35/00* (2006.01)
*F02N 11/08* (2006.01)

(52) U.S. Cl.
CPC ............ *F02D 35/00* (2013.01); *F02N 11/0822* (2013.01); *F02N 2200/0803* (2013.01)

(58) Field of Classification Search
CPC . F02N 11/0814; F02N 11/0818; F02D 35/00; F02D 1/042
USPC ..................... 701/112, 102; 123/179.3, 179.4
See application file for complete search history.

(56) References Cited

U.S. PATENT DOCUMENTS

| | | | |
|---|---|---|---|
| 4,295,540 A | 10/1981 | Hildebrecht | |
| 7,890,243 B2 | 2/2011 | Abendroth | |
| 2007/0170775 A1* | 7/2007 | Uchimura et al. | 303/112 |
| 2009/0319161 A1* | 12/2009 | Abendroth | 701/112 |

FOREIGN PATENT DOCUMENTS

| | | |
|---|---|---|
| DE | 3303467 A1 | 9/1983 |
| EP | 0990793 A2 | 4/2000 |
| EP | 1526276 A2 | 4/2005 |

* cited by examiner

*Primary Examiner* — Stephen K Cronin
*Assistant Examiner* — Xiao Mo
(74) *Attorney, Agent, or Firm* — Frank A. MacKenzie; Brooks Kushman P.C.

(57) ABSTRACT

A system and method for controlling an automatic stop-start system of an automotive vehicle is disclosed. The system monitors the status of the parking brake to determine if the parking brake is in a state of transition between an applied state and a released state (in either direction). If the parking brake is in a state of transition, then the automatic re-starting of the engine is inhibited until the parking brake is no longer in a state of transition.

8 Claims, 3 Drawing Sheets

SYSTEM AND METHOD FOR CONTROLLING AN AUTOMATIC STOP-START ENGINE SYSTEM IN AN AUTOMOTIVE VEHICLE HAVING AN ELECTRIC PARKING BRAKE

BACKGROUND

Certain automotive vehicles are equipped with an automatic "Stop-Start System", which automatically shuts down and restarts the engine of the vehicle to reduce fuel consumption of the vehicle under certain conditions, such as when the vehicle would otherwise idle. In operation, an automotive vehicle stop-start system detects when the vehicle has stopped (wherein the engine would otherwise be idling), at which time the system shuts the engine down. When power from the engine is required, e.g., the driver releases the brakes, the engine is automatically restarted. Other examples of when an automatic stop-start system may be employed are also possible. In any event, when a stop-start vehicle is in the auto-stop mode, i.e., the engine it shut down, the vehicle battery must supply power to electrical devices and components in the vehicle. In automotive vehicles with an electrically-actuated parking brake, the electrical power required to actuate the electric brake (i.e., apply the brake or release the brake) can be substantial, (on the order of about 45 amps), for a relatively short period of time (about 1 second). Under certain battery conditions, the battery may have insufficient power to power the electric brake actuator and the starter (to re-start the vehicle) at the same time.

In known automatic stop-start vehicles, the automatic stop-start system would be disabled when the level of the vehicle battery was below a certain threshold sufficient to enable the system to activate the electric parking brake and the vehicle starter both at the same time. The inventors hereof have developed a system and method of controlling an automotive vehicle stop-start system that permits the vehicle stop-start system to function at lower battery levels than previous known systems.

SUMMARY

A method for controlling an automatic stop-start system of an automotive vehicle having an engine and an electrically-actuated parking brake is disclosed. The method includes the steps of monitoring the parking brake to determine whether the parking brake is in a state of transition between an applied state and a released state, and inhibiting the automatic re-starting of the engine until a time when the parking brake is not in a state of transition.

DETAILED DESCRIPTION

A system and method for controlling operation of an automotive stop-start system is disclosed. The system monitors the status of the parking brake. If the parking brake is in the process of being actuated, i.e., the parking brake is in a state of transition, when a demand is made for the vehicle to re-start, then the re-starting of the vehicle engine is inhibited until the parking brake is no longer in a state of transition. As a result, the power demands of starting the engine and applying or releasing the parking brake are not made on the vehicle battery at the same time.

Figure 1:
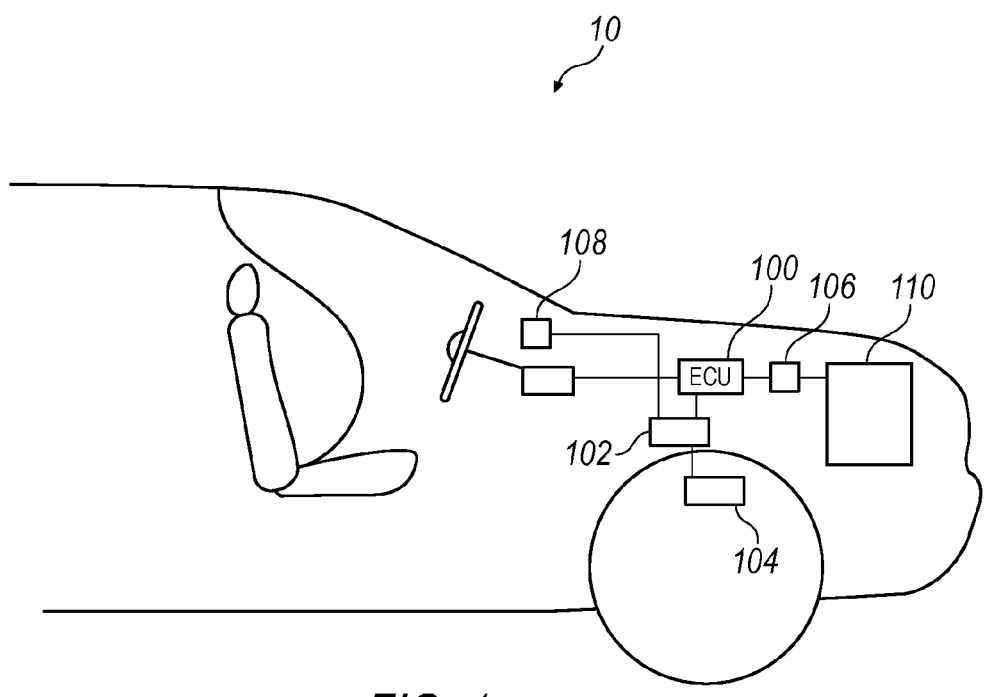
FIG. 1 is a simple illustrative schematic of an automotive vehicle in which an embodiment of the invention may be employed.

FIG. 1 is a simple diagram that illustrates an exemplary automotive vehicle in which the system and method for controlling the vehicle stop-start system may be implemented. Vehicle 10 is equipped with an Electronic Control Module (ECU) 100 that is communicatively-coupled to an ABS module 102 and a vehicle starter 106 (among other things not illustrated). The vehicle starter 106 is electrically coupled to the vehicle engine 110. The ABS module is communicatively coupled to a parking brake (including a parking brake actuator) 104 and a parking brake switch 108 located in the vehicle cabin. Each of the ECU 100, ABS module 102, parking brake 104, parking brake switch 108, vehicle starter 106 and vehicle engine 110 may be conventional components known to a person skilled in the art and may be coupled, as described above, in various ways, such as electrically or wirelessly.

Figure 2:
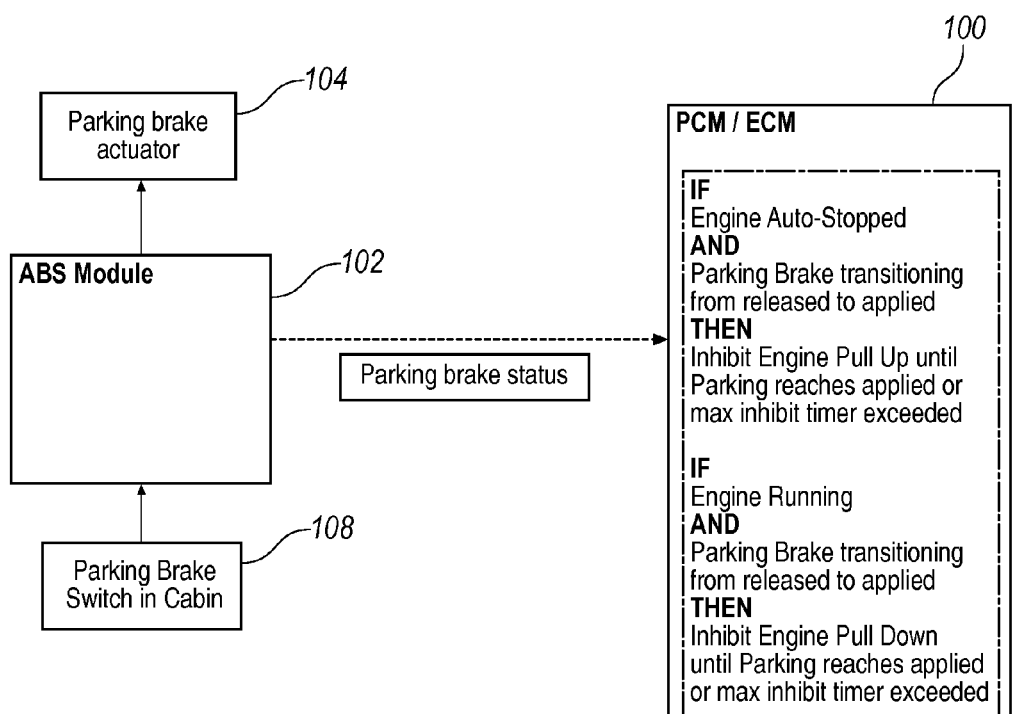
FIG. 2 is a functional block diagram of the components of the system for controlling the vehicle stop-start system.

FIG. 2 is a simple functional block diagram that also illustrates the components described above. That is, the parking brake switch 108 is communicatively coupled to the ABS module 102, which is communicatively coupled to both the parking brake 104 and the vehicle ECU 100. Functionally, a driver in the vehicle cabin may actuate parking brake switch 108 when the driver desires to apply the parking brake 104. The parking brake switch 108 sends a signal to the ABS module 102, which, in turn, sends a signal to parking brake actuator to actuate the parking brake 104.

Figure 3:
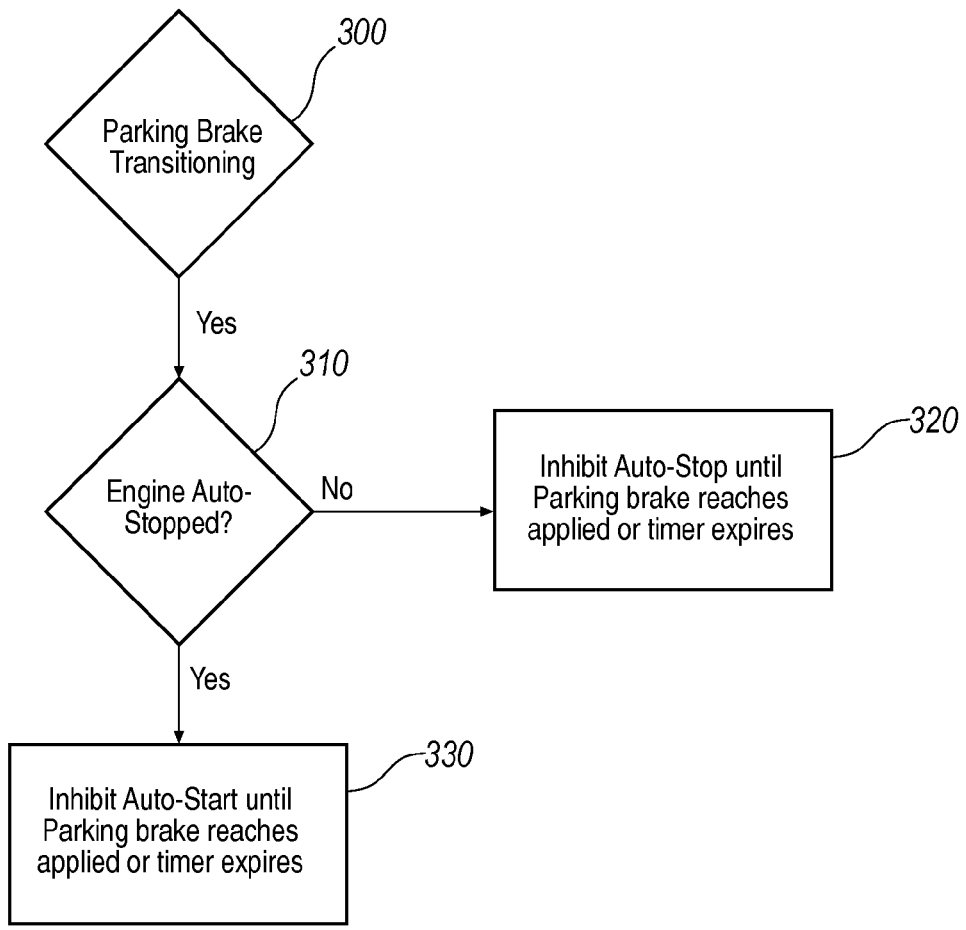
FIG. 3 is a flowchart illustrating an exemplary algorithm for controlling the deactivation of the vehicle's reverse brake assist system and Host Messaging Interface (MHI) messages/alerts.

The ABS module 102 provides a parking brake status signal to the ECM 100 to enable the ECM 100 to monitor the status of the parking brake. The ECM 100 employs the algorithm described in FIG. 3 to control the vehicle automatic stop-start system with respect to controlling the re-starting of the vehicle at times when the parking brake is being actuated, i.e., is in a state of transition. Specifically, the ECM 100 determines (at step 300) from the parking brake status signal (supplied by the ABS module 102) whether the parking brake is transitioning from one state to another (from an applied state to a released state or from a released state to an applied state). If so, then the ECM 100 determines (at step 310) if the vehicle engine 110 is shut down. If so, then the ECM 100 inhibits (at step 330) the auto-start of the engine 110 until the earlier of the parking brake 104 being fully applied or a pre-determined amount of time elapses. On the other hand, if the parking brake is not transitioning from one state to another, then the ECM 100 inhibits (at step 320) the auto-stop function of the engine 110 until the earlier of the parking brake 104 being fully applied or a pre-determined amount of time elapses.

According to the system and method described above, the re-starting of the vehicle engine is prevented from being initiated while a transition of the parking brake is being made. As a result, the vehicle battery will not experience the combined load of the vehicle starter and parking brake at the same time, which will permit the vehicle stop-start system to stay activated when the battery level is lower than in prior known systems.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation. For example, the above-described system and method could be used for forward motion (in addition to or instead of rearward motion).

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method for controlling an automatic stop-start system of an automotive vehicle having an engine and an electrically-actuated parking brake, comprising:
    in response to the engine being auto-stopped and a parking brake being in a transition state from an applied state to a released state or from a released state to an applied state, inhibiting the automatic re-starting of the engine until a time when the parking brake is not in a transition state.

2. The method of claim 1, further comprising, in response to the engine running and a parking brake being in a transition state from an applied state to a released state or from a released state to an applied state, inhibiting the automatic stopping of the engine until a time when the parking brake is not in a transition state.

3. The method of claim 2, wherein inhibiting the automatic stopping of the engine comprises inhibiting the automatic stopping of the engine until at least one of the following conditions is true: (i) the parking brake is not in a transition state, and (ii) a pre-determined period of time elapses.

4. The method of claim 1, wherein inhibiting the automatic re-starting of the engine comprises inhibiting the automatic re-starting of the engine until at least one of the following conditions is true: (i) the parking brake is not in a transition state, and (ii) a pre-determined period of time elapses.

5. A system for controlling an engine of an automotive vehicle, comprising:
    an engine configured to be automatically stopped and started;
    an electrically-actuated parking brake configured to be selectively applied and released in response to a control signal; and
    an electronic controller configured to inhibit the re-starting of the engine in response to the engine being automatically stopped and the parking brake being in a state of transition between an applied state and a released state;
    the state of transition comprises a transition from a state wherein the parking brake is applied to a state wherein the parking brake is released or a transition from a state wherein the parking brake is in a released state to a state wherein the parking brake is applied.

6. The system of claim 5, wherein the electronic controller is further configured to, in response to the engine running and the parking brake being in a state of transition between an applied state and a released state, inhibit the automatic stopping of the engine until a time when the parking brake is not in a state of transition.

7. The system of claim 6, wherein the electronic controller is further configured to inhibit the automatic stopping of the engine until at least one of the following conditions is true: (i) the parking brake is not in a state of transition, and (ii) a pre-determined period of time elapses.

8. The system of claim 5, wherein the electronic controller is further configured to inhibit the automatic re-starting of the engine until at least one of the following conditions is true: (i) the parking brake is not in a state of transition, and (ii) a pre-determined period of time elapses.

* * * * *